United States Patent [19]
Schramm, Jr. et al.

[11] Patent Number: 5,742,036
[45] Date of Patent: Apr. 21, 1998

[54] METHOD FOR MARKING, CAPTURING AND DECODING MACHINE-READABLE MATRIX SYMBOLS USING MAGNETO-OPTIC IMAGING TECHNIQUES

[75] Inventors: Harry F. Schramm, Jr., Winchester; Clyde S. Jones, Fayetteville, both of Tenn.; Donald L. Roxby; James D. Teed, both of Huntsville, Ala.

[73] Assignee: Rockwell International Corporation, Seal Beach, Calif.

[21] Appl. No.: 317,454

[22] Filed: Oct. 4, 1994

[51] Int. Cl.⁶ .................................................. G06K 7/08
[52] U.S. Cl. ........................ 235/449; 235/493; 324/235
[58] Field of Search ........................ 235/449, 493; 324/214, 215, 235, 244.1

[56] References Cited

U.S. PATENT DOCUMENTS

| | | | |
|---|---|---|---|
| 3,512,866 | 5/1970 | Griffiths et al. | 350/151 |
| 3,612,835 | 10/1971 | Andrews et al. | 235/440 |
| 3,755,730 | 8/1973 | Vogelgesang | 382/104 |
| 3,876,981 | 4/1975 | Welch | 382/182 |
| 4,029,017 | 6/1977 | Hubsch et al. | 102/262 |
| 4,180,207 | 12/1979 | Lee | 235/493 |
| 4,253,017 | 2/1981 | Whitehead | 235/449 |
| 4,452,082 | 6/1984 | Miwa | 73/599 |
| 4,538,059 | 8/1985 | Rudland | 235/468 |
| 4,574,312 | 3/1986 | Anderson | 348/294 |
| 4,614,366 | 9/1986 | North et al. | 283/70 |
| 4,625,167 | 11/1986 | Fitzpatrick | 324/235 |
| 4,883,949 | 11/1989 | Kokubo et al. | 235/449 |
| 4,924,078 | 5/1990 | Sant'Anselmo et al. | 235/494 |
| 4,972,475 | 11/1990 | Sant'Anselmo | 380/54 |
| 5,103,427 | 4/1992 | Erdol et al. | 367/7 |
| 5,293,031 | 3/1994 | Goto et al. | 235/449 |
| 5,344,720 | 9/1994 | Belt et al. | 428/692 |
| 5,424,523 | 6/1995 | Ohno et al. | 235/449 |
| 5,434,934 | 7/1995 | Togawa et al. | 324/244.1 X |

FOREIGN PATENT DOCUMENTS 2170072  6/1990  Japan.

*Primary Examiner*—John Shepperd
*Assistant Examiner*—Michael G. Lee
*Attorney, Agent, or Firm*—Charles T. Silberberg; Lawrence N. Ginsberg

[57] ABSTRACT

The present invention involves enhancing machine-readable matrix symbol markings on substrate materials by the addition of magnetizable materials, and then, at a later time, taking advantage of the magnetic properties associated with the matrix symbol marking to read the marking using a magneto-optic reading apparatus. For example, the marking material may be mixed with a media having magnetic properties and applied to a component surface either via stencil or as backfill. The magnetic material enables detection with the aid of a magnetic-property detection apparatus. Once detected, the matrix symbol image is transmitted to a symbol decoder so that the information represented by the symbol can be provided to a user.

11 Claims, 5 Drawing Sheets

METHOD FOR MARKING, CAPTURING AND DECODING MACHINE-READABLE MATRIX SYMBOLS USING MAGNETO-OPTIC IMAGING TECHNIQUES

STATEMENT OF GOVERNMENT INTEREST

The Government has rights in this invention pursuant to Contract No. NAS 8-38550.

BACKGROUND OF THE INVENTION

1. Field of the Invention

The present invention is directed to identification symbols for use with items to be identified, and more particularly, to an improved method for applying machine-readable matrix code markings onto various surfaces, and then reading and decoding the markings at later times, using magneto-optic imaging techniques.

2. Description of the Related Art

Two of the most common identification symbols used today are the bar code symbol and the matrix code symbol. The bar code consists of various width, and spaced, bars arranged in a linear array. The data in a bar code increases linearly per increase in length. A matrix code symbol, on the other hand, has data cells which typically consist of squares or other geometric units, and the data represented by such a symbol increases geometrically. One such matrix code symbol is known as the Vericode® symbol, and is taught by U.S. Pat. No. 4,924,078 to Sant'Anselmo et al. The matrix code is a more versatile code in that it can be directly applied onto or into a diversity of non-paper surfaces including metals. In addition to showing a unique data-containing symbol, U.S. Pat. No. 4,924,078 also discloses a system for capturing an image of the symbol, determining (i.e., decoding) the contents of the symbol and then displaying the decoded data contents.

Another patent of interest is U.S. Pat. No. 4,972,475 to Sant'Anselmo which disclosures an authenticating pseudorandom code and apparatus. Both of these patents are assigned to Veritec, Inc. of Chatsworth, Calif.

As will be disclosed below, the present invention is directed to an improved method of marking, as well as capturing, the compressed symbology disclosed in those patents. It is envisioned that the principles of the present invention may also be extended to other forms of compressed symbology.

Compressed symbology technology is ideally suited to inventory marking of parts and components in, but not limited to, the aerospace, automotive, electronics, and pharmaceutical industries. Incorporation of compressed symbology into computer-based manufacturing, fabrication, and assembly applications can eliminate a major source of errors—i.e., data reentry—by eliminating the manual reentry of component identification data. Compressed symbology can add significant value to automated design and manufacturing, configuration management, modular tooling, robotics, and quality control.

Direct part marking, in contrast with indirect marking techniques, tends to produce damage to the substrate. The goal of the marking process is to produce a readable, durable mark (in essence, a controlled defect) without disturbing the surrounding substrate.

In the past, symbol marking and reading has been accomplished in a variety of ways, as taught by the U.S. Patents to Griffiths et al. U.S. Pat. No. (3,512,866), Andrews U.S. Pat. No. (3,612,835), Welch U.S. Pat. No. (3,876,981), Trenkamp U.S. Pat. No. (4,029,017), Lee U.S. Pat. No. (4,180,207), Whitehead U.S. Pat. No. (4,253,017), Anderson U.S. Pat. No. (4,574,312), and Kokubo et al. U.S. Pat. No. (4,883,949). The U.S. patents to North et al. U.S. Pat. No. (4,614,366), Priddy et al. U.S. Pat. No. (4,939,354) and Goto et al. U.S. Pat. No. (5,293,031) also disclose methods of marking parts. U.S. Pat. No. 3,755,730 to Vogelgesang teaches a method of capturing images of alphanumeric characters that have been coated with paint using a magnetic reader. U.S. Pat. No. 4,538,059 to Rudland presents a method of capturing bar code symbols that have been covered with protective lamina using an infrared radiation device. U.S. Pat. No. 4,452,082 to Miwa and U.S. Pat. No. 5,103,427 to Erdol et al. disclose methods to measure physical characteristics of an object using ultrasound.

OBJECTS AND SUMMARY OF THE INVENTION

A principal object of the present invention, therefore, is to provide an improved method and apparatus for applying, and then later capturing and decoding, machine-readable matrix symbol markings on substrate materials, while overcoming many of the drawbacks and disadvantages of known similar methods and apparatus.

Another object of the present invention is to provide a method and apparatus for applying machine-readable matrix symbols of a material having magnetic properties that differ from the acoustic impedance properties of the "host" part or component.

These and other objects are accomplished through the application of viscous magnetic compounds, in the form of machine readable matrix symbols, to a "host" substrate, magnetizing the magnetic material by passing it through a magnetic field, and then using a magneto-optic imaging apparatus to capture the matrix symbols, whereupon the matrix symbol image is fed to a matrix symbol decoder to yield human-readable information.

Other objects, advantages, and novel features of the present invention will become apparent from the following detailed description of the invention when considered in conjunction with the accompanying drawings.

BRIEF DESCRIPTION OF THE DRAWINGS

FIG. 4a illustrating the magneto-optic imaging apparatus, including a video display monitor, while FIG. 4b is an exploded perspective view of the magneto-optic imaging apparatus.

DETAILED DESCRIPTION OF THE PREFERRED EMBODIMENTS

In a matrix code, all data is represented by equal sizes units, i.e., data cells. It is a sequence of black data cells representing a binary "1" and white data cells representing a binary "0". Strung together in specific sequences, the symbol represents alpha numeric characters. The equal size and the binary valuation of the data cells enables ease of decoding in the logic decision process. Matrix codes are also generally decodable from any direction or orientation, i.e. left, right, top or bottom.

Figure 1:
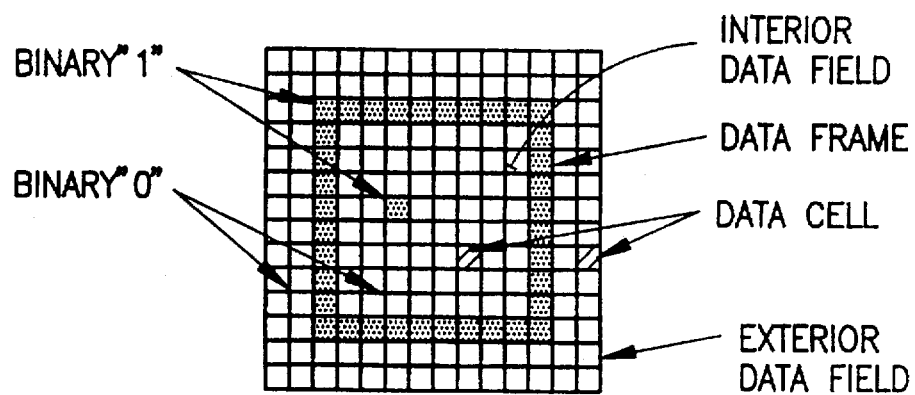
FIG. 1 illustrates the basic elements of a conventional matrix code symbol.
Figure 2:
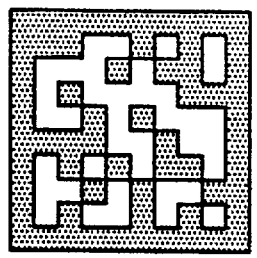
FIG. 2 illustrates the elements of a completed Vericode® symbol.

The Vericode® symbol, which is disclosed, described, and claimed in U.S. Pat. Nos. 4,924,078 and 4,972,475, both hereby incorporated by reference, is defined as having a matrix data format consisting of a single binary unit or data cell which is either a black cell that has a value of "1" or a white cell that has an opposite value of "0". The data cells are grouped in a data field which is generally surrounded by an orientation border of other data cells. The basic elements of a matrix symbol are illustrated in FIG. 1. FIG. 2 illustrates the elements of a completed Vericode® symbol.

A matrix symbol, such as the Vericode® symbol, requires balancing the following elements in the marking process:

a) the data density of the symbol;

b) the method of marking;

c) the marking resolution; and d) the material surface, topography, hardness, reflectivity, environment and texture.

The environmental hazards that will have an effect upon the marking process and therefore the readability of the matrix symbol and are usually found on metal surfaces are: (a) pits, (b) spots, (c) scratches, and (d) stains.

The effects of pits cause a blooming effect when viewed by the CCD (charged coupled device) and are interpreted by the decoding software as either a white data cell, or if it causes a shadow, will be interpreted as a black data cell. The blooming effect obliterates underlying data cell information and usually converts it to a large white area. The effects of spots can be interpreted as either a white data cell or if causes a shadow, will be interpreted as a black data cell depending upon the color of the spot. As noted above, the effects of scratching and stains either partially or fully obliterate smaller underlying data cells.

Manual marking methods are slow, error-prone, costly, and not compatible with today's advanced and automated manufacturing techniques. The preferred matrix symbology utilizing the present invention consists of an x/y array of data cells and is a digital representation of analog information. It is generated by a microprocessor-based system which controls the marking device. The preferred matrix symbology is ideally suited to being marked onto items, including metal, using micro-controlled marking equipment that features x,y and/or z coordinate movement of the marking head, the underlying table, or combination of both of them.

The use of a marking device incorporating x, y and/or z coordinated movement has advantages over those that do not. These systems provide for:

a) Automatic control over the positioning of the matrix symbol in relation to the item being marked.

b) Automatic control over the height (z-axis) positioning.

c) Automatic control over the width (x-axis) positioning.

d) Automatic control over the length (y-axis) positioning.

e) Automatic control over the speed of the marking process.

f) Automatic control over the force of the marking process.

g) Automatic control over the supplies being used in the marking process, e.g. ink, thread, paint, etc.

h) Repeatable settings.

i) Communications with digitally-based or oriented numerical control manufacturing systems, CAD (computer aided drafting) systems, CAM (computer aided manufacturing) systems, CIM (computer integrated manufacturing) systems, etc.

j) Facilitation of automated manufacturing and marking of items, eliminating manual marking operations.

k) Control of marking by computer or by the item marking data entered into a database automatically for the purpose of file update.

Figure 3:
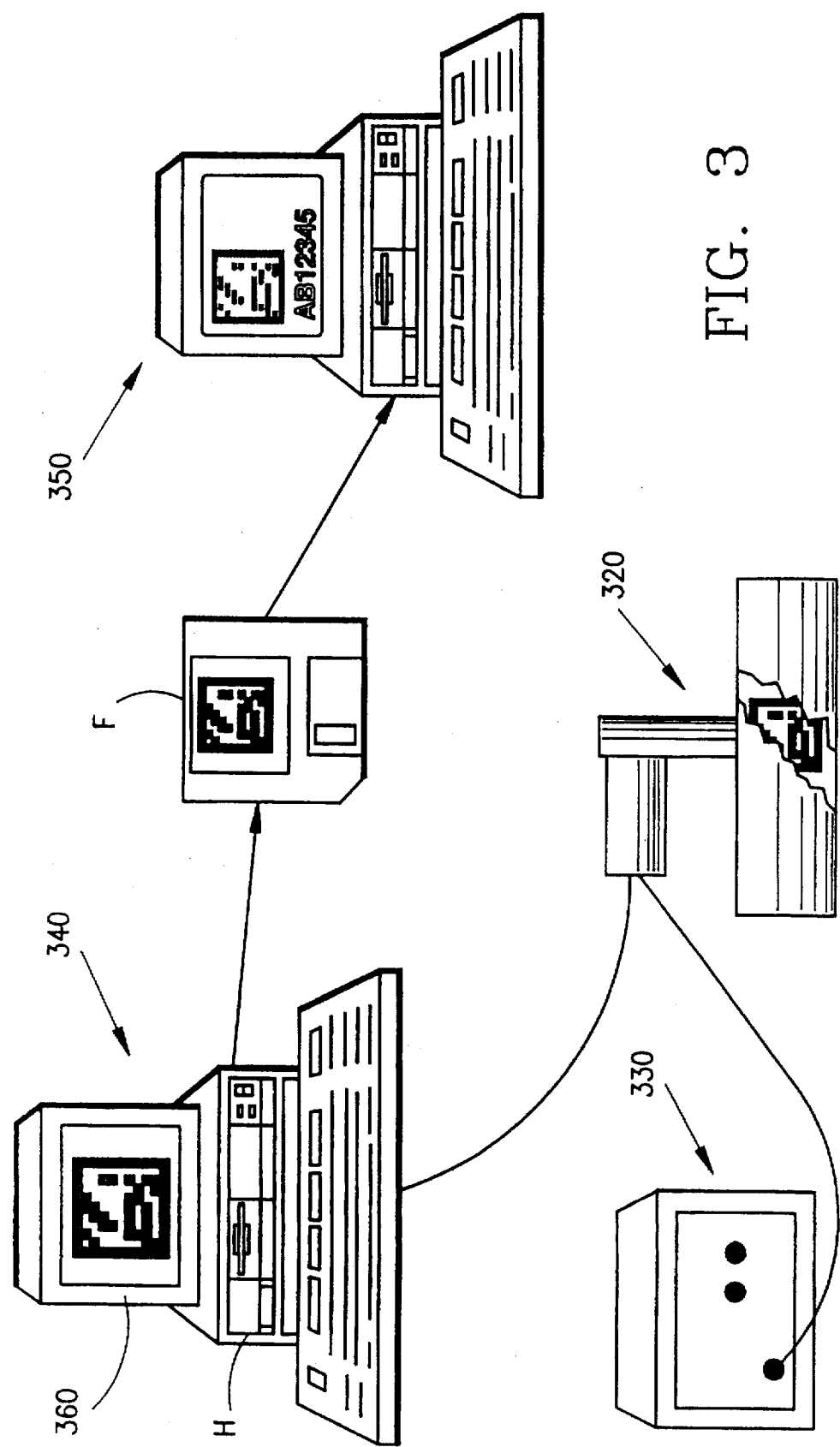
FIG. 3 is a Schematic diagram of the apparatus of the present invention.

FIG. 3 is a schematic diagram of the apparatus of the present invention. Machine-readable matrix symbols produced by a code generation software package contained within a computer are applied to the surface of a component which must be marked. The function of the code generation software package is to translate numeric/alpha numeric bytes of data entered by an operator into a machine-readable matrix symbol. In this invention, a marking device driver software package is added to the computer, which can interface with the code generation software package. The driver software is used to, (1) select the marking device to be used, (2) translate the matrix symbol contained within the code generation software into a format which can be recognized by the selected marking device, (3) provide the operator with provisions to enter marking device settings directly into the software or via menu(s) arranged by material type, (4) provide the operator with a method to automatically reset the marking parameters on the marking device to match those selected in the software and, (5) direct the marking device to apply the machine-readable matrix symbol directly on the material.

Exemplary methods of marking machine readable matrix symbols onto substrate materials have been described in applicants' co-pending patent application U.S. Ser. No. 08/164,492, filed on Dec. 8, 1993, the subject matter of which is incorporated herein by reference.

Marking methods which are contemplated by the present invention involve the application of a magnetic or magnetizable material to an appropriate surface of a component to be identified. The magnetic/magnetizable material is applied in such a manner as to create a machine-readable matrix symbol, which might, at some later time, be obscured by paint, contaminants or obstruction. Even so, the matrix symbol would be capturable by the magneto-optical apparatus contemplated for use in the invention.

Magneto-optic imaging (MOI) is a conventional technique which enables non-destructive inspection of most ferro-magnetic and non-ferro-magnetic metals. MOI produces images using the Faraday magneto-optic effect. The MOI apparatus induces eddy currents in the material to be inspected and a magneto-optic sensor images anomalies in the resulting magnetic field. Since material irregularities cause disturbances in the magnetic field, potentially dangerous surface and subsurface defects can be identified quickly and easily. The magneto-optic sensor can image both dynamic and static magnetic fields, which means that both ferromagnetic and non-ferromagnetic metals can be inspected.

As an example, a machine-readable matrix symbol could be applied to a substrate surface by depositing on the surface a viscous magnetic compound, e.g., iron particles suspended in an ink or paste base. In order to insure that the matrix symbol retains its magnetic charge, the compound's magnetic material should possess a high degree of magnetic retentivity and coercivity. The compound can be applied to the surface using a marking mask (stencil) or as backfill in a recessed mark created by dot peening, machine engraving, micro-abrasive blasting, laser etching or other suitable marking methods.

The above described marking methods may be used on various types of materials including aluminum, copper, and nickel alloys; heat and corrosion resistant steels; tool steels; reactive and refractive metals; coated, plated and/or special conditioned metals; polymeric material; polymeric laminates; rubber; glass and ceramics; and other non-metals.

Over an extended period of time, the symbol can remain visible or it may be obscured by paint, corrosion, contaminants, discolorations or obstructions. However, with the present invention, the symbols can be captured from either side using magneto-optical imaging (MOI) apparatus, and then decoded.

In order for MOI apparatus to capture a machine-readable matrix symbol with sufficient resolution and contrast for decoding, the symbol must possess a magnetic charge, or be able to be magnetized after its application. Magnetization of such a material would be possible by subjecting it to a magnetic field produced by coils, yokes, contact electrodes, or permanent magnets.

Referring again to FIG. 3, the image capturing apparatus of the present invention is shown to include a magneto-optical imager 320 (which may optionally be coupled to a scanner means) for detecting a matrix symbol 302. The imager 320 functions to receive the eddy current signals, and is physically scanned over the component bearing the two-dimensional matrix symbol in a predetermined pattern. A power supply and control unit 330 is provided for powering the imager 320. Variations in material homogeneity are detected as variations in time, amplitude, and polarity, and the resulting detected image is transmitted to a computer 340 for storage on its hard disk H or on a floppy disk F, or transmitted to a matrix symbol decoding system 350, or displayed on a CRT 360.

Figure 4A:
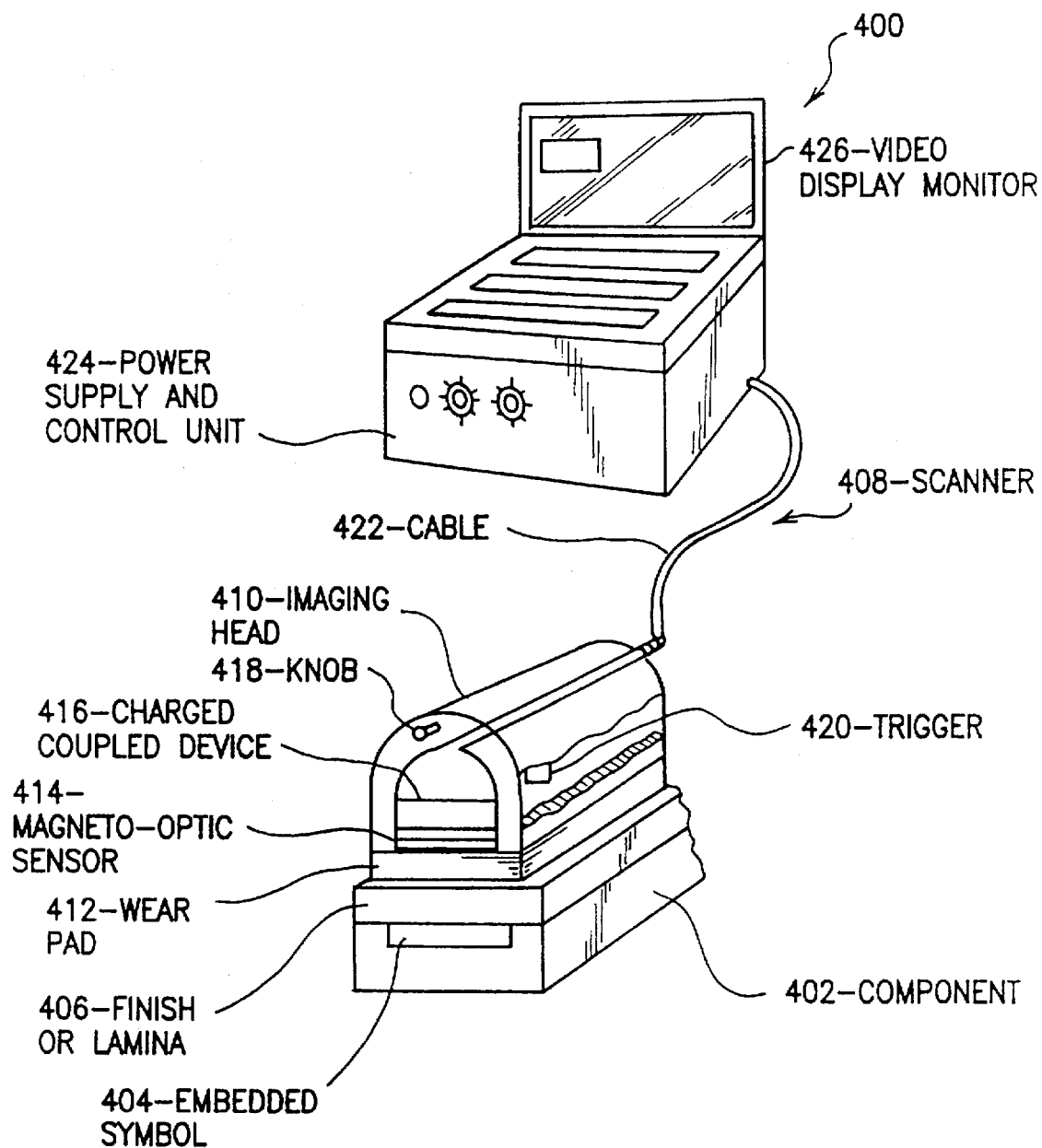
FIGS. 4a and 4b illustrate one embodiment of imaging and decoding apparatus employed by the present invention.
Figure 4B:
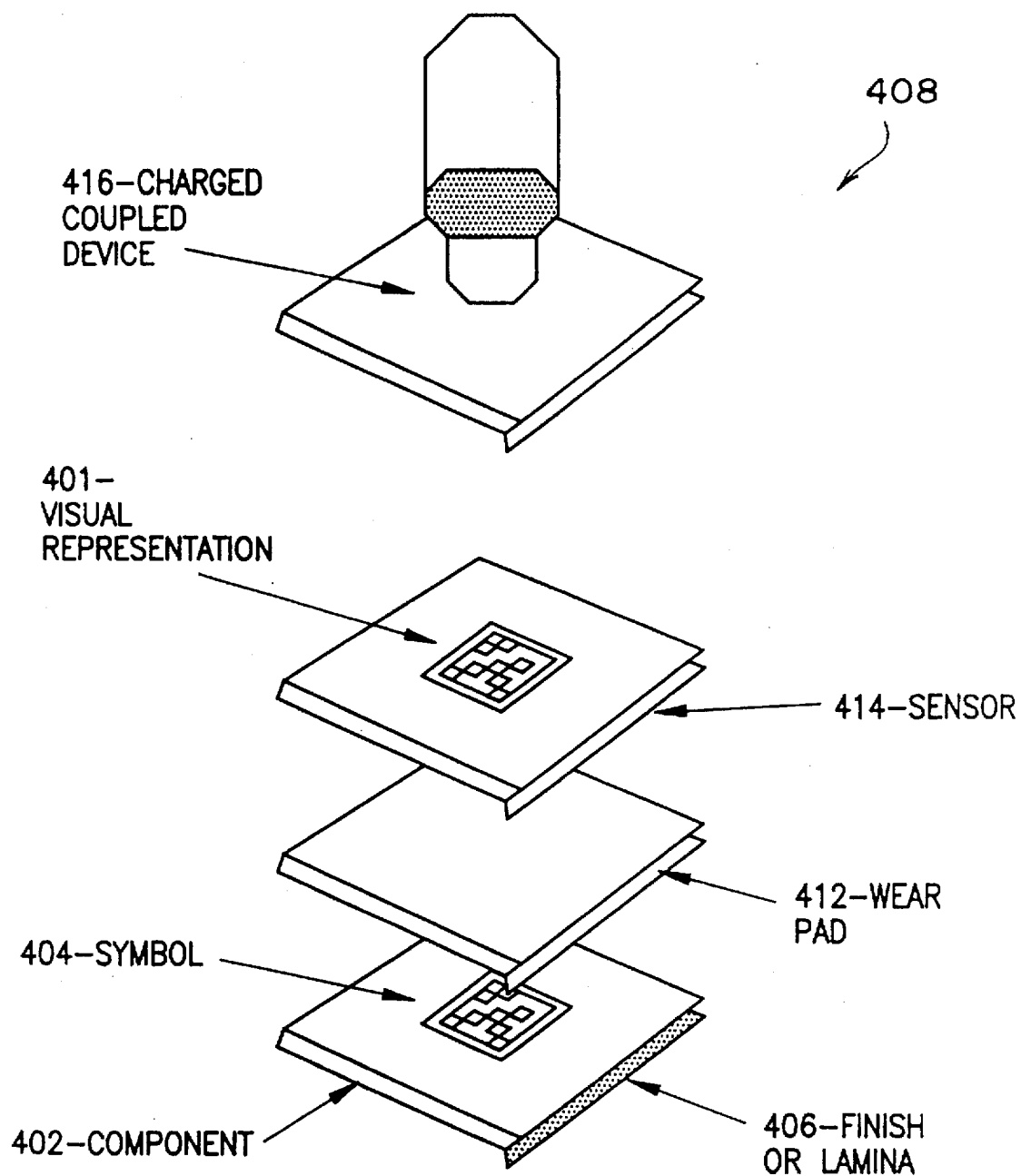

FIG. 4 shows one example of a system 400 of detection apparatus and decoding apparatus which is contemplated for use with the present invention. As shown, the component 402 carries a two dimensional matrix symbol on a region thereof. The symbol 404 may be, and preferably is, covered by paint or some other protective finish or lamina 406. The magneto-optic imaging apparatus 408 includes an imaging head 410 having a replaceable polyethylene wear pad 412 to protect the MOI sensor 414, a charged coupled device 416 or other similar type imaging camera with light source, an image level control knob 418 to control the image quality, and a trigger 420 to activate the camera. A power cable 422, which interconnects the magneto-optic imaging apparatus 408 with a power supply and control unit 424, carries power and video signals. Controls on the unit 424 enable variation in frequency and power level. The computer contains the two-dimensional matrix symbol enhancement and decoding software as well as a video display monitor 426 to view the two-dimensional symbol image and decoded information.

An image of the embedded symbol 404 is obtained by placing the magneto-optic scanner, i.e., optic imaging apparatus 408, onto the marked surface 402. As the scanner 408 make contact with the surface 402, magnetic anomalies are detected by the magneto-optic sensor 414, which produces a visual representation 401 of the disrupted magnetic field in a magnetic medium in real-time utilizing the Faraday and/or Kerr magneto-optic effects. This is accomplished by producing a rotation of the major direction of polarization of the rays of a light beam reflected off of, or through a magnetic medium. The visual image projected on the sensor 414 is then captured for processing by the CCD camera, CMOS camera, or other suitable image capture device 416.

The image capturing method of the present invention contemplates the use of a hand-held magneto-optic/eddy current imager with adjustable power and frequency settings. The portable unit includes an MOI head which detects magnetic anomalies. The head is physically scanned across the surface of an object while looking through an eye piece or glancing at a video monitor. The imager provides the operator with real-time images so that he or she can quickly locate the matrix symbols located under layers of paint or other surface coatings. When the image is centered on the video monitor, the operator depresses a trigger (such as trigger 420 shown in FIG. 4) to capture the symbol image using the charge coupled device (CCD) of similar type of camera built into the imager. The image is then processed via a software package (see the following discussion regarding this software) which may be built into the portable unit to facilitate decoding of the data contained in the symbol. The magneto-optic sensors contained within most MOI imagers can image both dynamic and static magnetic fields, which means that symbols can be read from ferromagnetic as well as non-ferromagnetic metals.

Figure 5:
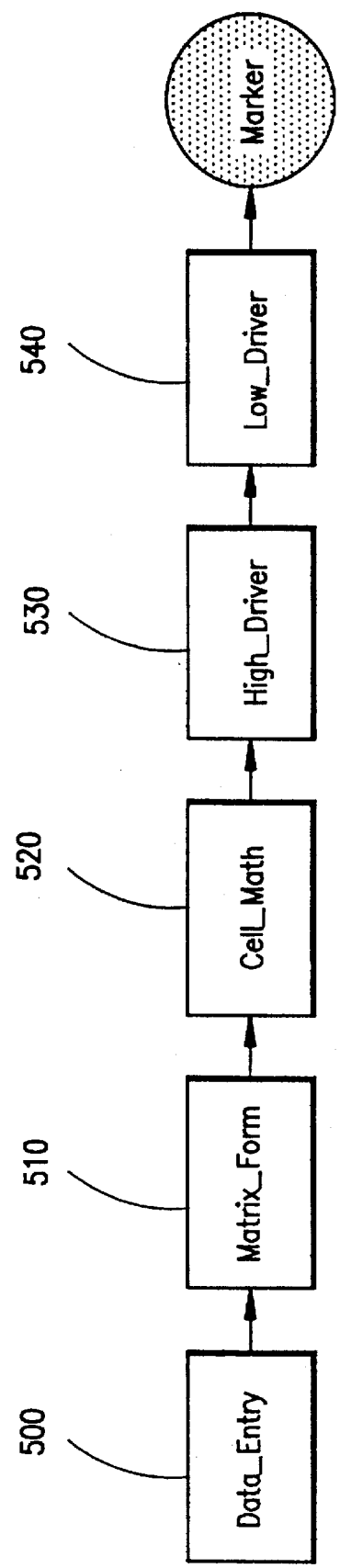
FIG. 5 illustrates a flow chart of the driver software utilized by the present invention.

Referring now to FIG. 5, a flow chart of the driver software is illustrated. Data is entered as indicated by numeral designation 500. Data entry 500 is made via keyboard, alternative machine readable symbol, file, communications link (LAN, modem, RF link, serial port), application, data base, data transform, data encrypt or data encode. A matrix is formed as designated by numeral designation 510. The parameters input include size, geometry, cell colors, control data, and dimensions. Certain mathematical computations are made, as designated by block 520. The parameters relate to the size of the cell, the start position, cell parameters, cell orientation, timing, code, ENC, RED, EDAC. High driver 530 includes parameters which pertain to markers, material types, compensation factors, color, and verification identification. A low driver 540 includes a drive marker.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method of identifying components using machine readable matrix symbol markings, comprising the steps of:
applying a machine-readable matrix symbol to a surface of a component, said symbol exhibiting properties which are recognizable by magneto-optical imaging apparatus,
detecting said matrix symbol at a later time using magneto-optical imaging apparatus, and
decoding said matrix symbol.

2. The method of claim 1, wherein said step of detecting said matrix symbol further includes the step of subjecting the component surface to a magnetic field.

3. The method of claim 2, wherein said step of subjecting the component surface to a magnetic field further includes limiting exposure of said surface to a region in close proximity to said matrix symbol.

4. The method of claim 1, wherein said matrix symbol is a Vericode® matrix symbol.

5. The method of claim 1, wherein said step of decoding said matrix symbol includes displaying the image on a video medium.

6. The method of claim 1, wherein said step of detecting comprises sampling eddy-current signals from the component and transmitting the signals to a memory element.

7. The method of claim 6, and further including the step of transmitting the signals from the memory component through a conversion module to convert the eddy-current signals to video signals.

8. Apparatus for identifying a magnetic machine readable matrix symbol marking on a component, comprising: magneto-optical imager to be placed upon said means for generating an energy medium, means for transmitting said energy medium toward and away from a magneto-optic image of said component, means for converting said energy medium to information signals, computer means for analyzing said signals coming from said transmitting means to determine the content of information contained in the symbol marking, and means for displaying said information in a human-readable format.

9. The apparatus of claim 8, wherein said generating means, said transmitting means, said converting means, computer means and said displaying means are contained in a miniaturized container.

10. The apparatus of claim 8, wherein said computer means includes means for transferring signals from said transmitting means to memory means, and means for decoding said transferred signals to produce a signal train representative of said symbol marking.

11. The apparatus of claim 10, and further including means for converting said signal train to an ASCII string whereby said symbol can be displayed on said displaying means.

\* \* \* \* \*